April 22, 1969 P. MURIE, JR., ET AL 3,439,934
TRAILER LEG
Filed July 5, 1967 Sheet 1 of 2

INVENTOR
PETER MURIE JR.
WILLIAM R. SCOTTON
BY
Fetherstonhaugh & Co.
ATTORNEYS

INVENTOR
PETER MURIE JR.
WILLIAM R. SCOTTON
BY
ATTORNEYS

United States Patent Office
3,439,934
Patented Apr. 22, 1969

3,439,934
TRAILER LEG
Peter Murie, Jr., Terrace, British Columbia, and William R. Scotton, Ganges, British Columbia, Canada, assignors to Skeena Kenworth Ltd., Terrace, British Columbia, Canada
Filed July 5, 1967, Ser. No. 651,282
Int. Cl. B60s 9/04
U.S. Cl. 280—150.5     6 Claims

ABSTRACT OF THE DISCLOSURE

Supporting leg apparatus for a trailer having a supporting leg carried on the end of a rotatable shaft movable transversely of the trailer and cam means operable as the shaft is moved transversely for rotating the latter and with it the leg between an extended ground-engaging position and a retracted ground-clear position.

Background of the invention

The invention relates to retractable supporting legs for trailers, particularly trailers which are used for transporting heavy loads, such as logs and the like.

Tractor and trailer combinations are so arranged that the tractor normally supports the trailer on a fifth wheel which is mounted on the tractor slightly ahead of the rear wheels thereof the latter usually being spaced apart to the limit allowed by highway regulations. In order to meet highway width regulations, conventional liftable legs with which trailers are now equipped must be mounted on the trailer at some distance behind the rear wheels of the tractor in order to provide sufficient room for them to be swung between a ground-engaging position and a ground-clear position. Trailer legs and the operating and supporting mechanism therefor must bear the greater proportion of the load carried by the trailer.

Summary of the invention

The present invention provides a trailer supporting leg which by means of operating apparatus connected thereto is slidably movable transversely of the trailer between retracted and extended positions relative thereto and which is also rotatable about an axis transversely of the trailer between a ground-clear and ground-supporting position, said operating apparatus being so arranged that the leg may be slidably moved in its ground clear position from its retracted position a predetermined distance towards its extended position and thereafter rotated from its ground-clear position to its ground-engaging position. The supporting leg may therefore be located at the front end of a trailer as its operational characteristics will permit it to be slidably moved while in a ground-clear position from its retracted position inwardly of and above the rear wheels of a tractor which may be connected to the trailer to a position outwardly and clear of said rear wheels of the tractor and then rotated to a ground-engaging position.

The invention, therefore, provides a supporting leg which by reason of the fact that it is mounted at the front end of the trailer will be required to take much less load than would be required with convnetional trailer legs mounted aft of said front end. The present invention provides a supporting leg apparatus for trailers comprising an elongated supporting member mounted in a transversely extending position on the trailer for longitudinal movement and rotative movement about its longitudinal axis, said member having an outboard end, means for moving the supporting member longitudinally between extended and retracted positions relative to the trailer, guide means fixed relative to the trailer and operatively connected to the supporting member to prevent rotative movement thereof as the latter is moved a predetermined distance from its retracted position and then to rotate the latter about its said axis as it is moved to its extended position, and a supporting leg connected at the outboard end of the supporting member for movement with the latter between a ground-clear position and a ground-engaging position as said member is moved from its retracted to its extended position.

Description of the preferred embodiment

Figure 1:
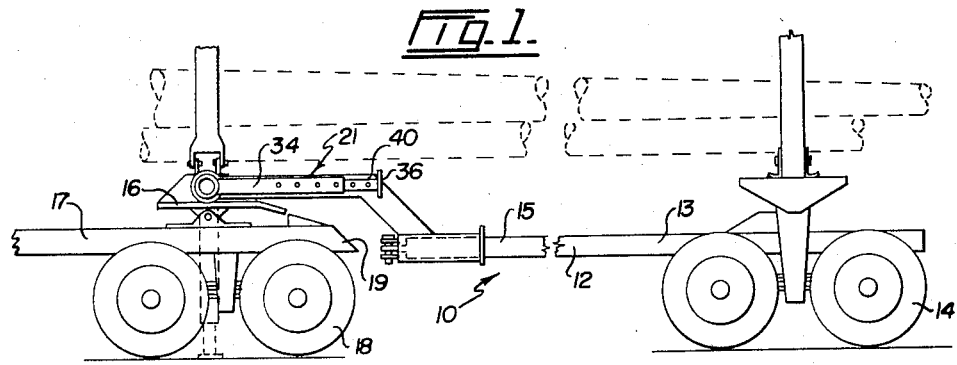
FIGURE 1 is a side view of the invention in position on a trailer which is connected to a tractor, the supporting leg being illustrated in solid lines in a ground-clear position and in dotted lines in a ground-engaging position.
Figure 2:
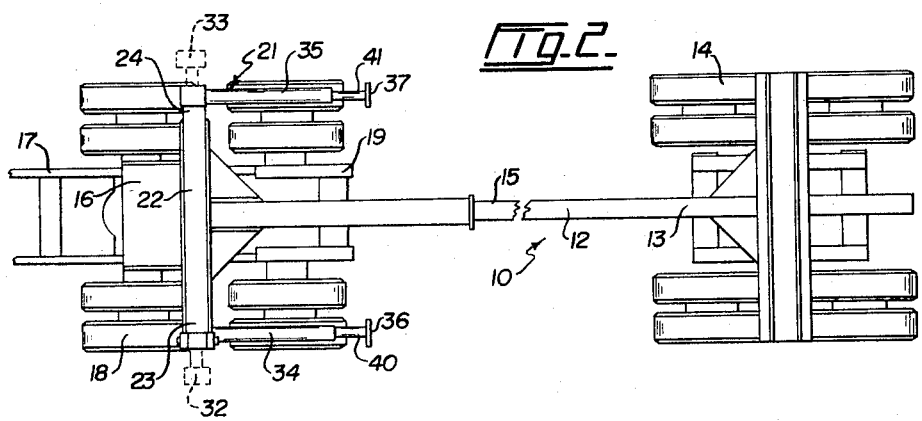
FIGURE 2 is a plan view of the invention of FIGURE 1, showing in solid lines the trailer leg in its ground-clear position and in dotted lines in its ground-engaging position.

Referring to the drawings particularly FIGURES 1 and 2 thereof, there is illustrated a trailer 10 of the pole type normally employed for transporting logs. This trailer has an elongated central pole 12 supported adjacent its after end 13 on a dual tandem wheel assembly 14. At its forward end 15, the pole 12 is detachably connected in a known manner, to the fifth wheel 16 of a tractor 17 (shown in part only), said tractor having a rear wheel assembly 18. In tractors of this nature, the fifth wheel is located on the longitudinal centre line of the tractor in advance of the centre of support of the rear wheel assembly 18 so that the pole 12 extends for a considerable length forwardly of the rearmost wheel of the wheel assembly 18.

The trailer leg supporting apparatus 21 of the present invention comprises an open-ended elongated, tubular, large-diameter cylindrical casing 22 which is welded or otherwise securely fastened at the front end 15 of the pole 12 so as to extend over the rear wheel asesmbly 18 but which terminates at its ends 23 and 24 short of the outside limits of the latter.

Figure 3:
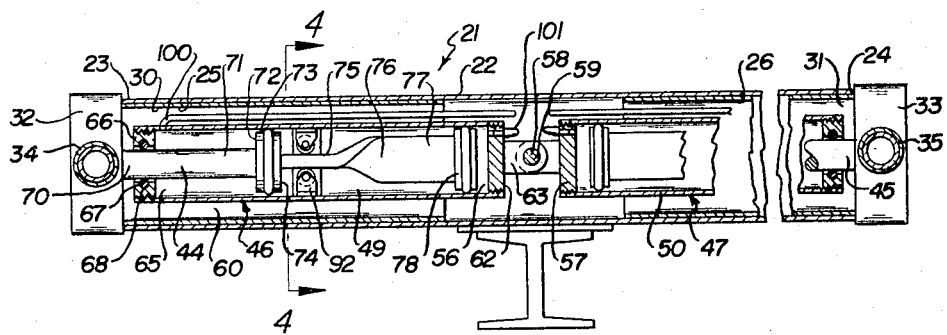
FIGURE 3 is a central sectional side view of the invention in a ground-clear position.

Into each of the open ends 23 and 24 of the casing are slidably and rotatably fitted elongated tubular supporting shafts or members 25 and 26 respectively (see FIGURE 3) each of said supporting shafts being slightly less than one-half the length of said casing. These shafts have outboard ends 30 and 31 respectively on which heavy caps 32 and 33 respectively of a larger diameter than the diameter of the casing 22 are secured as by welding, and to the caps 32 and 33 are secured, as by welding, laterally extending supporting legs 34 and 35 respectively, which are telescopically adjustable so as to length and are provided with feet 36 and 37 respectively at their free ends 40 and 41, respectively.

Connected to the caps 32 and 33 respectively, as by welding, are piston rods 44 and 45 of hydraulically operated piston and cylinder assemblies 46 and 47 having cylinders 49 and 50 respectively. These cylinders 49 and 50 extend inwardly through the supporting shafts 25 and 26, respectively, and are connected at their inner ends 56 and 57, respectively, to the shank 58 of a bolt 59 which extends transversely through the casing at the middle length thereof.

Cylinder 49 is substantially the same length as supporting shaft 25, however, it has an outside diameter smaller than the inside diameter of said supporting shaft to provide an annular passage 60 therebetween. At its inner end 56 the cylinder 49 is closed by a cap 62 welded thereto, said cap having an eye member 63 secured therethrough through which the shank 58 of the bolt 59 passes.

Figure 6:
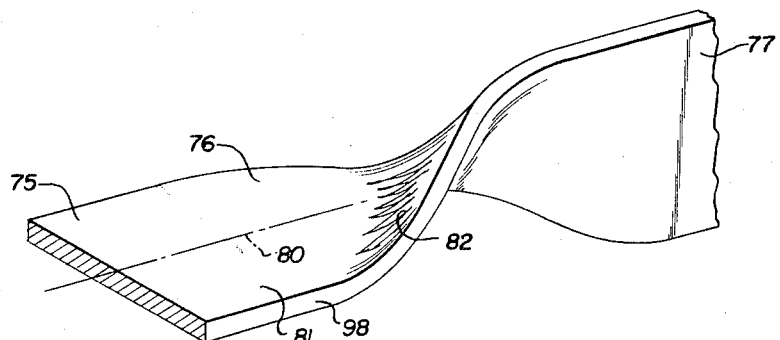
FIGURE 6 is an enlarged isometric view of another portion of the guide means.

At its outer end 65 the cylinder is provided with an annular closure cap 66 through which a piston rod 44, which has a circular cross section, slidably passes, a hydraulic seal being effected by the provision of an annular lip seal 67 fitted in an annular groove 68 formed in the cap 66. The outer end 70 of the piston rod 44, as has been previously described, is non-rotatably secured as by welding to cap 32 and said piston rod is non-rotatably secured at its inner end 71, as by welding, to one face 72 of a piston head 73. This piston head has secured to its opposite face one end 75 of an elongated flat thick plate 76, the length of said plate being substantially one-half the length of the cylinder 49. A piston head 78 is also secured at the other end 77 of the plate. This plate (see FIGURE 6) which acts as a cam extends in a flat condition for substantially half its length from piston head 73 and then twists gradually about its longitudinal axis 80 through approximately 90 degrees, thereby forming a straight flat portion 81 and a helically wound portion 82.

Figure 4:
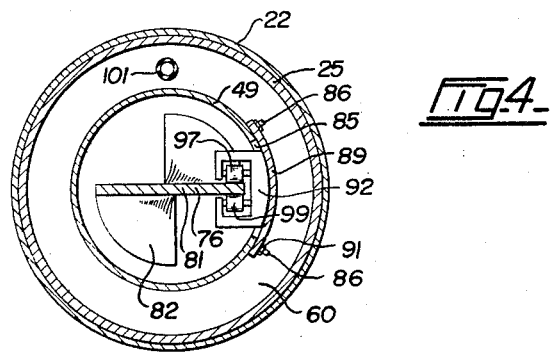
FIGURE 4 is an enlarged sectional view taken along line 4—4 of FIGURE 3 illustrating the guide means.

The cylinder 49 (see FIGURE 4) at its middle length, is provided with a circumferentially elongated aperture 85 having studs 86 secured adjacent each end thereof. This aperture is covered by a cover plate 89 which is provided with elongated slotted apertures 90 which receive the studs 87, said plate being secured as by nuts 91 threaded over said studs.

Figure 5:
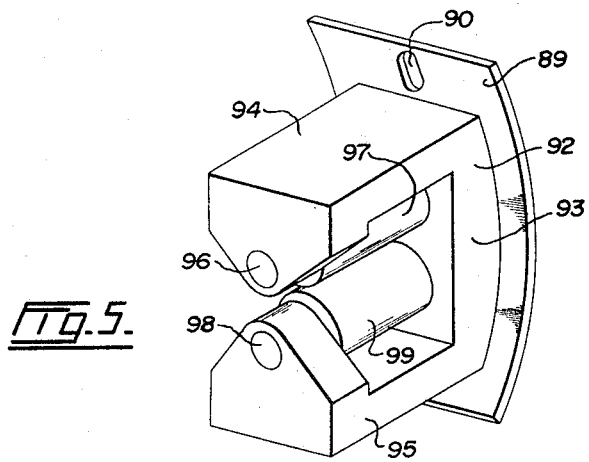
FIGURE 5 is an enlarged isometric view showing a portion of the guide means.

To the plate 89 (see FIGURES 4 and 5) is secured a bracket 92. This bracket is C-shaped having a base 93, and L-shaped arms 94 and 95. Between arm 94 and the base 93 extends a pin 96 on which a guide roller 97 is mounted and between arm 95 and the base 93 extends a pin 98 on which a guide roller 99 is mounted, said rollers being spaced apart a distance a little greater than the thickness of the plate 76 to permit the said plate to extend therebetween so that the roller 97 rollably engages one side of said plate near an edge 98 thereof and roller 99 rollably engages the opposite side of said plate 76 adjacent said edge.

The cylinder 49 is connected at each end via fitting 100 and conduits 101 passed through the annular passage to a suitable source, not shown, of pressurized hydraulic fluid with which tractors are normally equipped. Manually operated conventional valves, not shown, are employed to direct the fluid into and out of the cylinder 49 so as to provide movement of the piston rod 44 between extended and retracted positions relative to the cylinder 49, and thereby pass the plate 76 beween the rollers 97 and 99. These rollers will permit slidable but non-rotatable movement of the plate 76 during the passage of the portion 81 therethrough, but then will rotate the plate through 90 degrees as they engage the helical portion 82. The piston rod 44 will move in a fashion corresponding to the movements of the plate 76 and will therefore impart corresponding movements to the leg 34.

The angular relationship between leg 34 and plate 74 is such that with the piston and cylinder assembly 46 arranged in its most retracted position, leg 34 will assume a rearwardly extending horizontal ground clear or transporting position as shown in solid lines in FIGURES 1 and 2 above and inside the outside limits of the wheel assembly 18. The length of the straight flat portion 81 of said plate 74 is sufficient to permit the leg 34 to be moved outwardly still in its ground-clear position beyond the outside limits of said rear wheel assembly 18 so that upon passage of the helical portion 82 through the rollers 97 and 99, the leg 34 will be swung downwardly clear of said wheel assembly to a vertical or ground-engaging position, as shown in dotted lines in FIGURES 1 and 2, said leg being telescopically adjusted when in this position so that the foot 36 thereof will rest upon the ground. The movements aforesaid are, it will be understood, accomplished by proper direction of the hydraulic fluid into and out of either end of the cylinder 49.

The construction and manner of operation of piston and cylinder assemblies 46 and 47 are identical, consequently, details of assembly 47 are not described or illustrated in detail.

It will be understood that, although the apparatus as described is eminently suited for pole trailers, it may, without any alterations of consequence, be employed with various types of trailers where total width and load distribution are factors of major concern.

We claim:

1. Support leg apparatus for trailers comprising an elongated supporting member mounted in a horizontal transversely extending position on the trailer for longitudinal movement and rotative movement about its longitudinal axis, said member having an outboard end, means for moving the supporting member longitudinally between extended and retroacted positions relative to the trailer, guide means operatively associated with the supporting member for preventing rotative movement of the latter as it is moved a predetermined distance from its retracted position and then to rotate the latter about its said longitudinal axis as said member is moved to its extended position, said guide means comprising a cam element having a straight camming surface extending longitudinally of the support member and a helical camming surface following said straight camming surface, and a guide element for cooperating with the camming surfaces of said cam element, one of said elements being fixed relative to the trailer and the other being fixed relative to the supporting member, a supporting leg connected at the outboard end of the supporting member for movement with the latter from a substantiallly horizontal ground clear position to a substantially vertical ground-enaging position as said member is moved from its retracted to its extended position.

2. Support leg apparatus for trailers comprising an elongated tubular housing adapted to be mounted in a transversely extending position on a trailer, an elongated shaft mounted in the housing for longitudinal and rotative movement between retracted and extended positions, said shaft having an outboard end, a fluid operated piston and cylinder assembly extending longitudinally of the housing, the cylinder of said assembly being non-rotatably connected to the housing and the piston of said assembly being non-rotatably connected to the shaft and being adapted when connected to a source of pressurized fluid to move said shaft between its retracted and extended position, said piston having a camming portion presenting a first longitudinally extending straight camming surface of predetermined length and a second helical camming surface following said first surface, a guide element secured to the cylinder for consecutively engaging said camming surfaces as the piston is moved relative to the cylinder so as to cause said piston and with it the shaft to slidably and non-rotatably move a distance equal to said predetermined distance from its retracted position and then to rotate as it continues to move to its extended position, a leg secured to the outboard end of the shaft longitudinally and rotatably movable with the latter from a ground clear position to a round-engaging position as the shaft moves from its retracted to its extended position.

3. Support leg apparatus as claimed in claim 2 in which the leg is formed of a pair of telescopically adjustable parts.

4. Support leg apparatus as claimed in claim 2 in which said camming portion comprises an elongated thick plate extending in a straight flat condition for a predetermined length and then being twisted about its longitudinal axis through substantially 90°.

5. Support leg apparatus as claimed in claim 4 in which the guide element comprises a C-shaped bracket mounted on the cylinder wall and a pair of spaced apart rollers mounted on the bracket rollably engaing opposite side surfaces of the plate adjacent a side edge of the latter.

6. Support leg apparatus as claimed in claim 2 in which the piston of said assembly comprises a piston rod having a pair of longitudinally spaced apart piston heads, said camming portion extending between the piston heads.

References Cited

UNITED STATES PATENTS

| 2,194,594 | 3/1940 | Halley. | |
|---|---|---|---|
| 2,958,538 | 11/1960 | Norris et al. | 214—515 X |
| 3,125,352 | 3/1964 | Gouin | 280—150.5 |
| 3,135,407 | 6/1964 | Back | 214—515 |
| 3,261,488 | 7/1966 | Van Raden | 214—515 |

LEO FRIAGLIA, *Primary Examiner.*

U.S. Cl. X.R.

214—515; 254—86; 280—404